(12) United States Patent
Habedank et al.

(10) Patent No.: US 6,223,835 B1
(45) Date of Patent: May 1, 2001

(54) BATTERY-POWERED HAND-GUIDED POWER TOOL

(75) Inventors: Winrich Habedank, Diez; Klaus-Dieter Arich, Hünstetten-Beuerbach, both of (DE)

(73) Assignee: Black & Decker Inc., Newark, DE (US)

( * ) Notice: Subject to any disclaimer, the term of this patent is extended or adjusted under 35 U.S.C. 154(b) by 0 days.

(21) Appl. No.: 09/493,744

(22) Filed: Jan. 28, 2000

(30) Foreign Application Priority Data

Jan. 29, 1999 (DE) ............................................... 199 05 085

(51) Int. Cl.[7] .................................................. B23B 45/02
(52) U.S. Cl. ............................................. 173/217; 310/50
(58) Field of Search ..................... 173/217, 117, 173/170; 310/47, 50

(56) References Cited

U.S. PATENT DOCUMENTS

| | | | |
|---|---|---|---|
| 4,930,583 | * 6/1990 | Fushiya et al. | 173/170 |
| 5,054,563 | * 10/1991 | Zapf | 173/217 |
| 5,553,675 | * 9/1996 | Pitzen et al. | 310/50 |
| 5,671,815 | * 9/1997 | Kabatnik et al. | 173/217 |
| 5,816,121 | * 10/1998 | Yoshimizu et al. | 173/217 |

* cited by examiner

*Primary Examiner*—Scott A. Smith
(74) *Attorney, Agent, or Firm*—Charles E. Yocum; John D. Del Ponti (57) ABSTRACT

A battery-powered hand-guided power tool is provided, such as a hammer, includes a tool housing 3 that contains an electric motor M, a grip housing 2 and a rail-and-channel structure 36,37,54,55 for releasable mounting of a rechargeable battery pack 50. The battery pack 50 is locked in an operative position on the housing 3 in which electrical contacts (51) of the battery pack 50 and associated electrical contacts 42 of the tool housing are electrically connected along a contact length extending in a longitudinal direction of the rail-and-channel arrangement. A latch structure 18,19 located on the tool housing 3 is movable between a latched position and a release position. When the latch structure 18,19 is moved from the latched position into the release position, the battery pack 50 can be moved in the direction of the longitudinal extent of the rail-and-channel structure 36,37,54,55 out of the operative position and can be removed from the tool housing 3. Between the battery pack 50 and the tool housing 3 there is arranged a spring 38 which loads the inserted battery pack 50 in a direction of a displacement movement out of the operative position. The distance of travel of the spring 38 is greater than the contact length of the contacts 42,51 and the restoring force of the spring 38 at the contact length is greater than the weight of the battery pack 50.

5 Claims, 11 Drawing Sheets

BATTERY-POWERED HAND-GUIDED POWER TOOL

BACKGROUND OF THE INVENTION

This invention relates to a battery-powered, hand-guided power tool, and in particular to a hammer, in which a rechargeable battery pack is releasably connected to a tool housing of the hammer via a rail-and-channel structure, and the battery pack is locked in an operative position on the tool housing in which electrical contacts of the battery pack and associated electrical contacts of the power tool are electrically connected along a contact length extending in the direction of a longitudinal extent of the rail-and-channel structure.

A power tool, such as a drilling hammer, is disclosed in German Patent Publication No. DE 195 21 423 (A1) and includes a tool housing. The tool further includes a rail-and-channel structure which is formed on a side portion of the tool housing and extends on a front side of a portion of the housing. The tool housing is also formed with a rear hand grip substantially at right angles to a longitudinal axis of a tool holder supported at the front of the tool. A spring-loaded latch element is located in a lower part of the hand grip, which, when in a locking position and with a battery housing assembled with the tool housing, engages in a latch recess of the battery housing to thus hold the battery pack in its operative position on the tool housing. The latch element is accessible through an opening at the lower end of the hand grip, so that a user may move the latch element, manually against the force of a compression spring, out of the locking position and into a release position.

With structure disclosed in German Patent Application No. DE 195 21 423, a user has to hold the power tool with one hand and use the other hand to move the latch element into a release position to release the battery pack. If, in so doing, the user has oriented the power tool so that the battery pack is able to come free of the power tool under gravity, there is a risk that the battery pack, which the user is unable to hold at the same time, will drop out in an uncontrolled manner, which can lead to damage to the battery pack and perhaps even to injury. If, on the other hand, the user holds the power tool oriented so that, as the latch element is displaced, the battery pack is supported on the portion of the housing forming the hand grip, that is, with the tool holder axis directed upwardly, the battery pack will not move from its position as the latch element is drawn back. When the latch element is subsequently released, it will again enter the latch recess of the battery pack, so that the battery pack continues to be connected to the power tool.

Also, with the structure disclosed in German Patent Application No. DE 195 21 423, if the user inserts the battery pack in the last position mentioned, the electrical contacts of the power tool and the battery pack may come into contact, but the latch element may, unnoticed, fail to lock in the latch recess. Although the power tool can be operated in this position, the battery pack will suddenly become detached from the power tool when this is inclined at a relevant angle, the surprise effect in particular of such an occurrence possibly leading to injury to the user or even to other persons, for instance, if the power tool is being used on a construction site.

SUMMARY OF THE INVENTION

Therefore, it is an object of this invention to construct a power tool such that, with greater safety in use, the battery pack can be moved in a simple manner out of its operative position.

With this and other objects in mind, this invention contemplates a battery-powered, hand-guided power tool in which a rechargeable battery pack is releasably connected to a tool housing. A rail-and-channel structure is formed with a longitudinal extent between opposite ends thereof, for facilitating the assembly of the battery pack in an operative position on the tool housing. A locking device, including a latch structure, is located on the housing for locking the battery pack with the housing in the operative position, and includes a latch structure which is locatable between a device latched position, coincidental with the operative position of the battery pack, and a device release position. A plurality of electrical battery contacts are located on the battery pack, and a plurality of electrical tool contacts are located on the tool housing. The battery contacts and the tool contacts have a prescribed contact length along which they electrically engage. The battery contacts and the tool contacts extend in a direction along the longitudinal extent of the rail-and-channel structure, and are electrically connected when the battery pack in is the operative position. The battery pack is movable from the operative position into a battery release position when the latch structure is moved from the device latched position to the device release position to permit the battery pack to be moved in the direction of the longitudinal extent of the rail-and-channel structure for removal from the tool housing. A spring is located on the tool housing and positioned to apply a spring-loaded force to the battery pack in the operative position in a direction of a displacement movement of the battery pack out of the operative position. The spring is expandable by a distance greater than the prescribed contact length, and the restoring force of the spring when extended to the prescribed contact length is greater than the weight of the battery pack.

Other objects, features and advantages of the present invention will become more fully apparent from the following detailed description of the preferred embodiment, the appended claims and the accompanying drawings.

DETAILED DESCRIPTION OF THE PREFERRED EMBODIMENTS OF THE INVENTION

Figure 1:
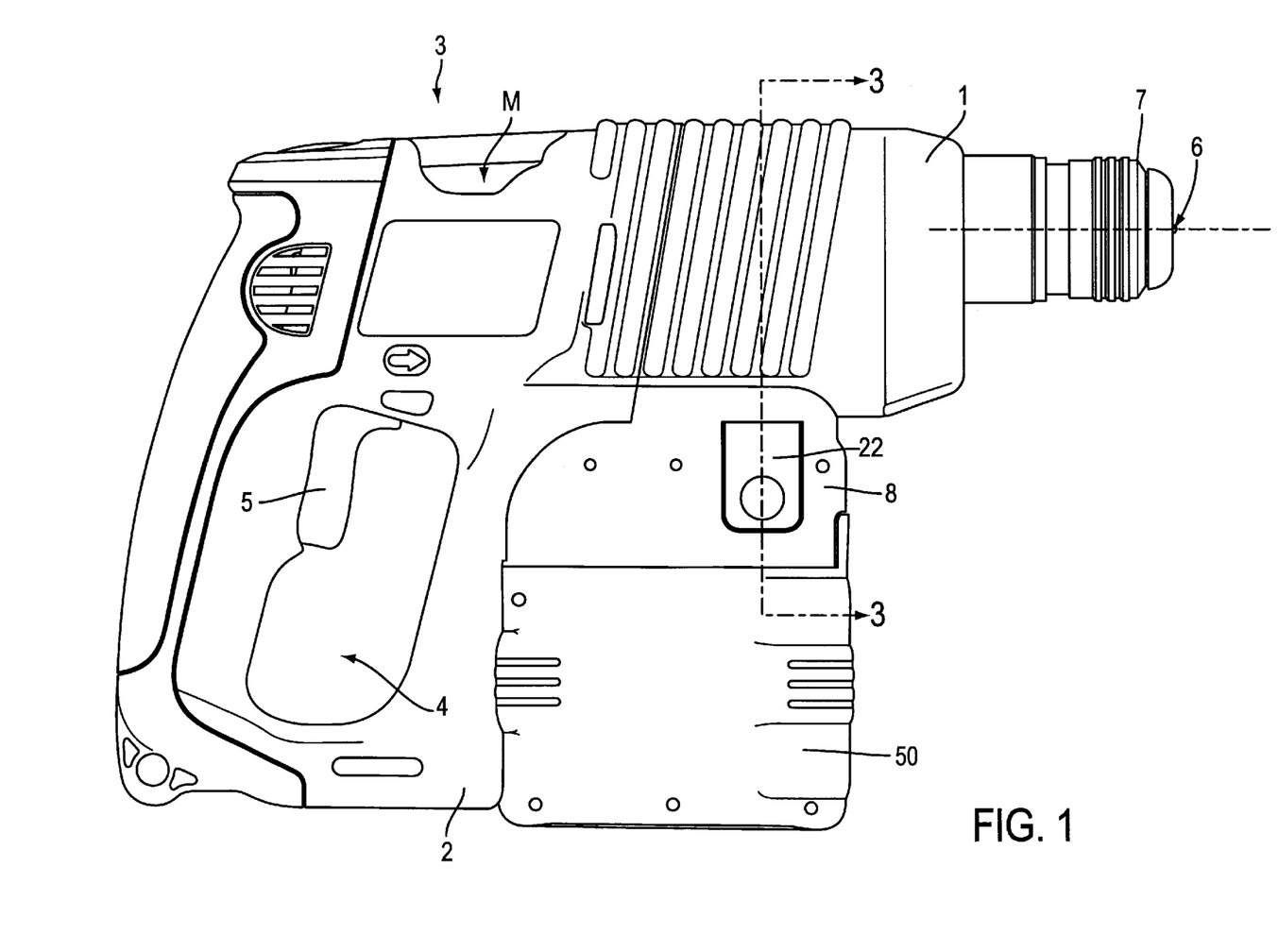
FIG. 1 is side view showing a drilling hammer with battery pack located in its operative position in accordance with certain principles of the invention.

A power tool, such as a drilling hammer illustrated in FIG. 1, has a tool housing 3, which includes a barrel-like motor housing 1, open towards a rear end, and further includes, at the rear end, a grip housing 2 formed by two half-shells (one shown). An electric motor M and a pneumatic hammer mechanism (not shown) are normally located in the tool housing 3. A tool holder 7 is fixed in the customary manner on a spindle, not shown) at a front end of the drilling hammer. A hammer bit (not shown), can be inserted in the tool holder 7 and, in the operation customary for drilling hammers, is loaded by impacts from the hammer mechanism and/or is rotatably driven.

The grip housing 2 forms a grip opening 4, into which a switch actuator 5 for activating the electric motor extends. The motor is powered by a battery pack 50, which is detachably secured to the drilling hammer in a manner to be described hereinafter.

Figure 3:
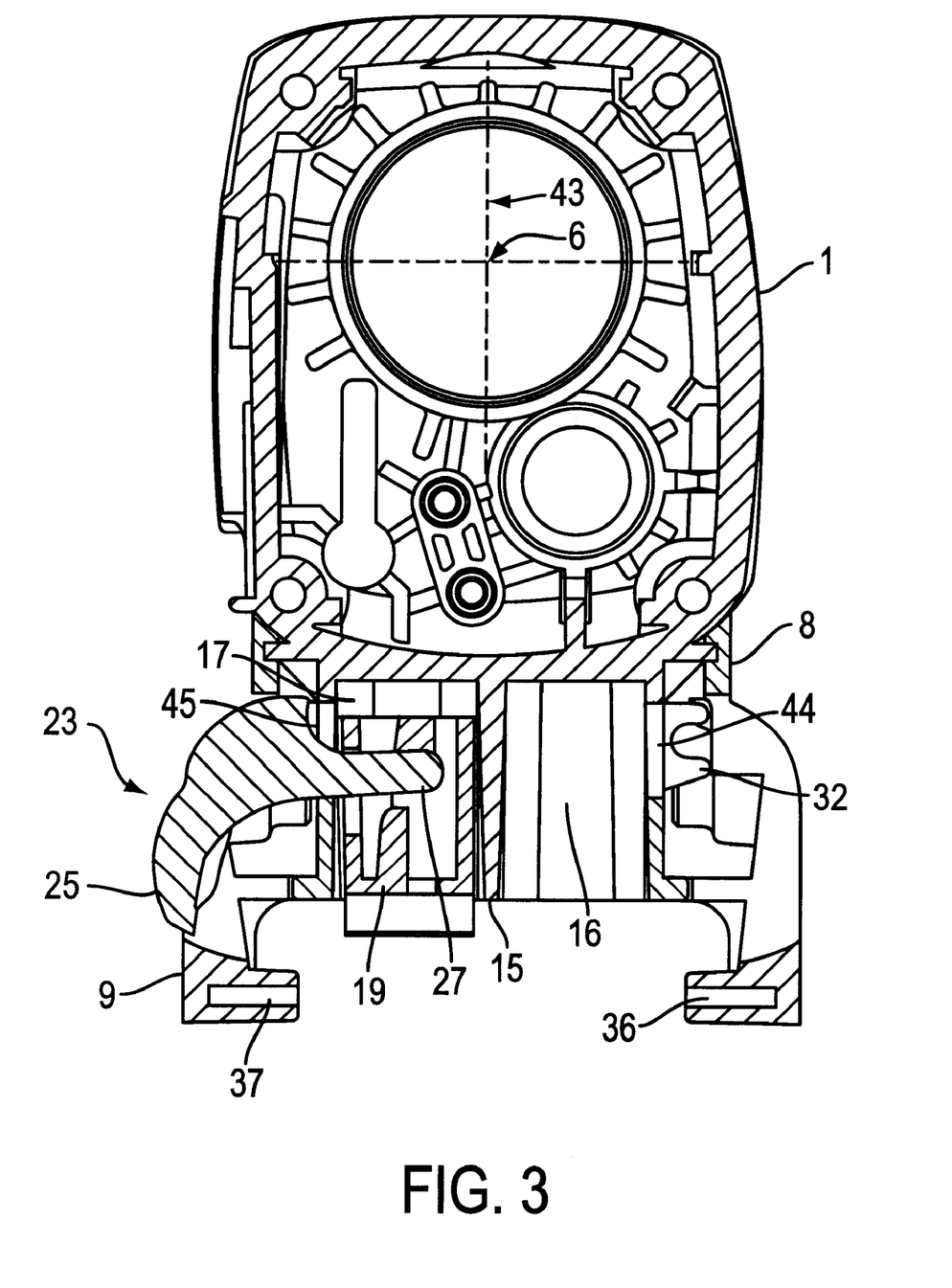
FIG. 3 is a sectional view taken along line III—III of FIG. 1 through tool housing of the drilling hammer, but with the omission of the parts of motor and gear structure normally present in this region, in accordance with certain principles of the invention.
Figure 4:
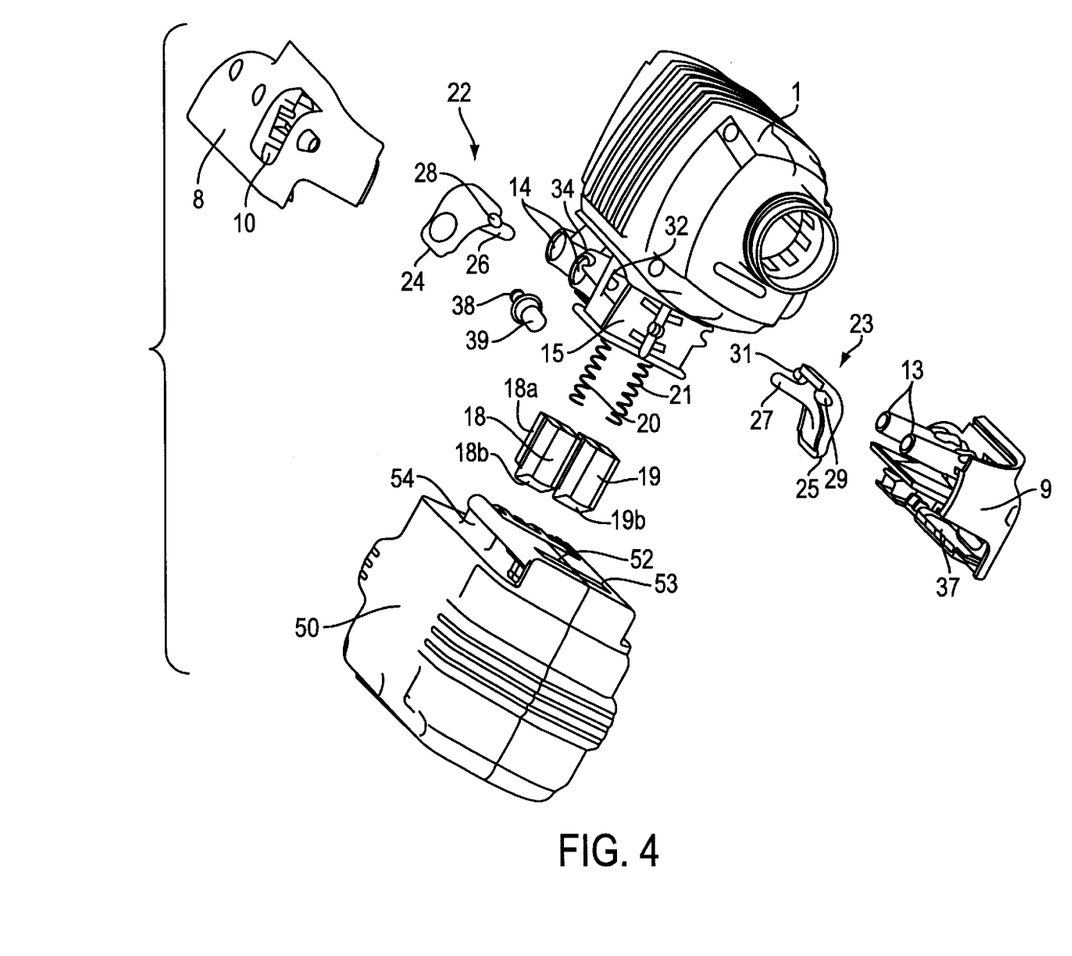
FIG. 4 is an exploded perspective view showing the tool housing, with parts to be assembled therewith, and the battery pack, in accordance with certain principles of the invention.
Figure 5:
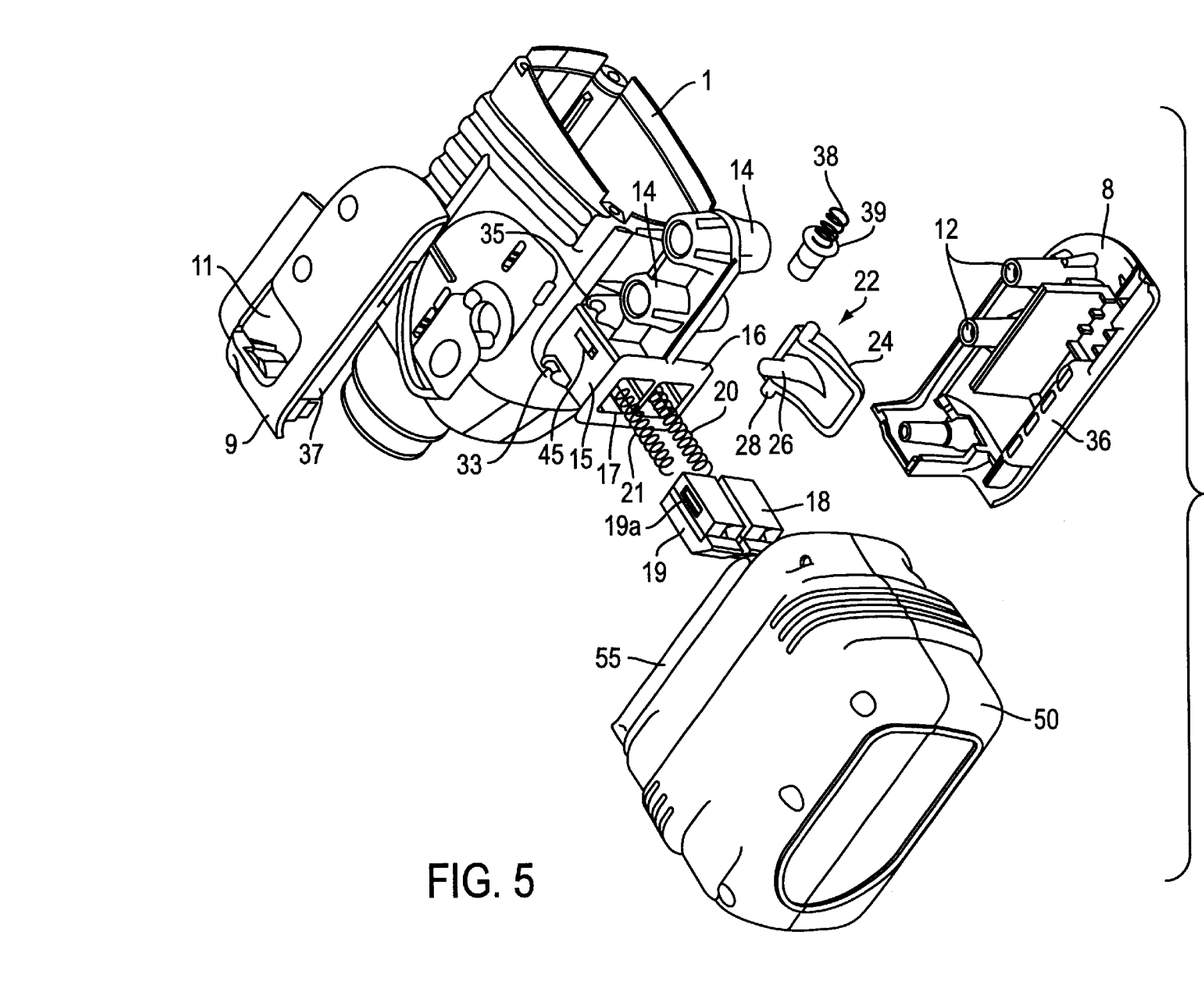
FIG. 5 is an exploded perspective view showing the tool housing, with parts to be assembled therewith, in accordance with certain principles of the invention.

As shown in FIGS. 3, 4 and 5, the motor housing 1 has an integrally formed frame part 15 on its underside, which at its rear region has integrally formed connecting sleeves 14 and in its front region has two frame-part recesses 16, 17 that are separated by a transverse wall that lies in the central plane 43 (FIG. 3) of the tool housing 3, wherein a longitudinal axis 6 of the tool housing coincides with an axis of rotation of the tool holder 7.

Compression springs 20, 21 and latch elements 18, 19 are inserted into respective ones of the frame-part recesses 16, 17, which are in the form of blind bores. In the outer side walls of the recesses 16, 17 there are respective slit shaped through openings 44, 45. Into each of these through openings 44,45 extends an inner arm 26, 27 respectively of an operating element 22, 23, respectively, which operating element is in the form of a substantially L shaped two armed lever and, formed integrally therewith, is a respective front pivot pin 28, 29 and a respective rear pivot pin 30, 31. The pivot pins 26, 28 and 29, 31 are snapped into front and rear bearing sleeves 32, 34 and 33, 35 respectively, integrally formed with the frame part 15 and open towards the outside, so that the operating element 22, 23 is pivotally mounted on the frame part.

Secured laterally to the frame 15 are covers 8, 9, which have a respective through opening 10, 11 into which the respective outer arm 24, 25 of the respective operating element 22, 23 extends, so that the outer face of that arm 24, 25 is accessible from the outside of the covers. The covers 8, 9 have inwardly projecting, internally threaded connecting sockets 12, 13, which in the mounted state extend into the connecting sleeves 14. By means of screws (not shown), internal threads of the connecting sockets 12,13, the covers 8, 9 are releasably held on the frame part 15, and they cover in particular the pivot pins 28, 30, and 29, 31 of the operating elements 22, 23, respectively, and the associated bearing sleeves 32, 34 and 33, 35, respectively, and constitute a visual downward continuation of the motor housing 1.

It will be noted that, by means of this construction, the latch elements 18, 19 form a locking device having a latch structure which can be very easily mounted and held within the recesses 16, 17. If the spring 20,21 and the associated latch element 18,19 is inserted into the frame-part recess 16,17, then, with the latch element fixedly held, the inner arm 26, 27 of the associated operating element 22, 23 is pushed through the respective slit shaped through opening 44, 45 in the side wall of the respective recess 16, 17 and into a lateral slit shaped opening 18a,19a of the respective latch element 18, 19. This arrangement prevents the compression spring 20, 21 from being able to push its associated latch element 18, 19 out of the recess 16, 17, respectively.

The pivot pins 28, 30 and 29, 31 of the operating element 22, 23, respectively, are snapped into the bearing sleeves 32, 34 and 33, 35 respectively, so that the operating elements 22, 23 are positioned in the position shown in FIG. 3 for the operating element 23. As assembled, the compression spring 20 (FIG. 4), presses the latch element 19 downward toward the battery pack 50 and against the inner arm 27 of the operating element 23 as the arm extends into the opening in the latch element 19, so that the operating element 23 is biassed, causing it to pivot clockwise. This pivoting movement is limited by contact of the inner arm 27 against the lower edge of the slit shaped through opening 45 provided in the frame part 15, that is, the latch element 19 is able to protrude downwards out of the recess 17 only as far as the lowered latched position illustrated in FIG. 3. The same applies to the latch element 18, not illustrated in FIG. 3, which is inserted in the recess 16 and cooperates with the operating element 22.

Figure 2:
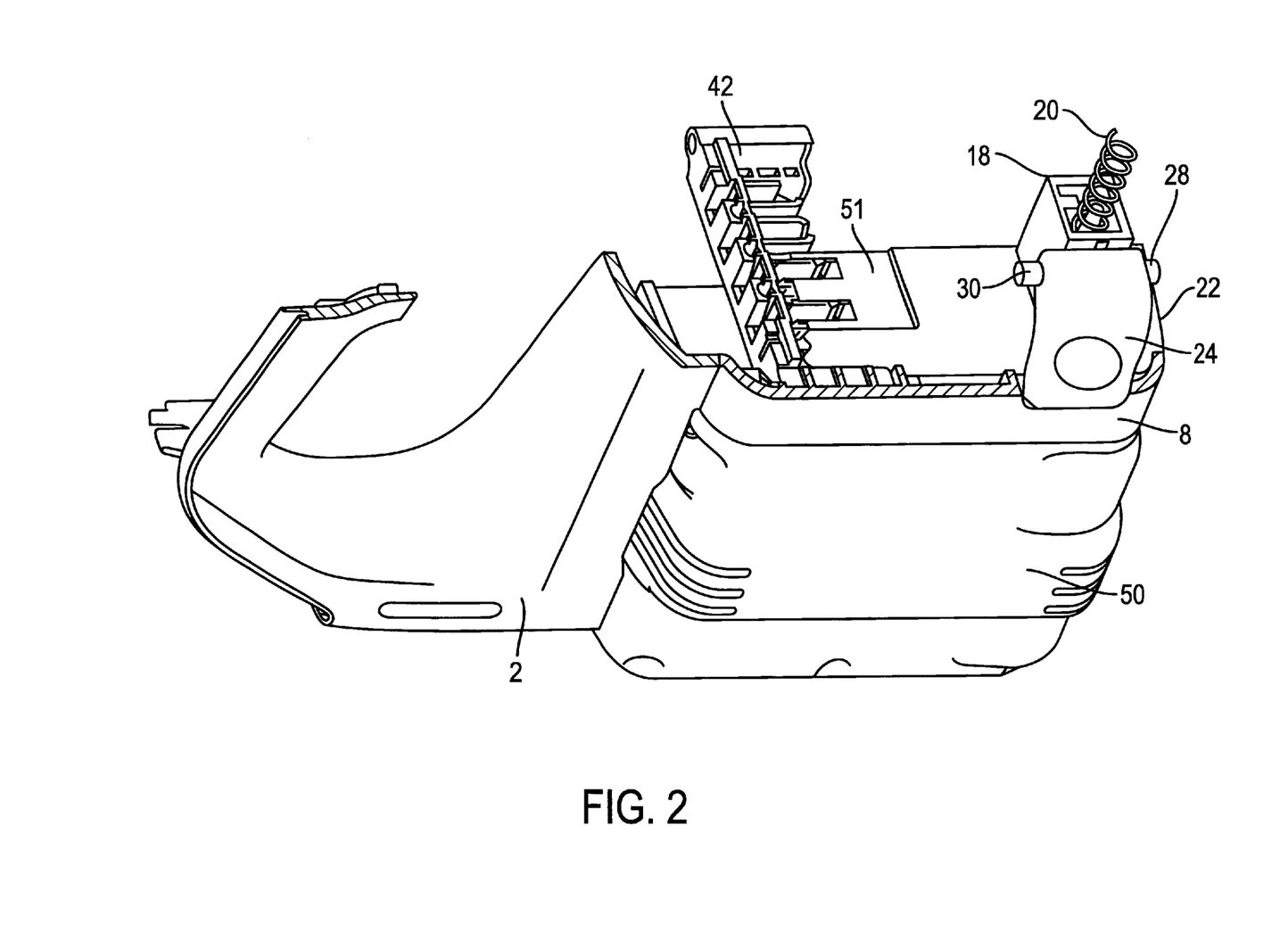
FIG. 2 is a partial perspective view showing a battery pack in assembly with parts of the drilling hammer of FIG. 1 in accordance with certain principles of the invention.
Figure 6:
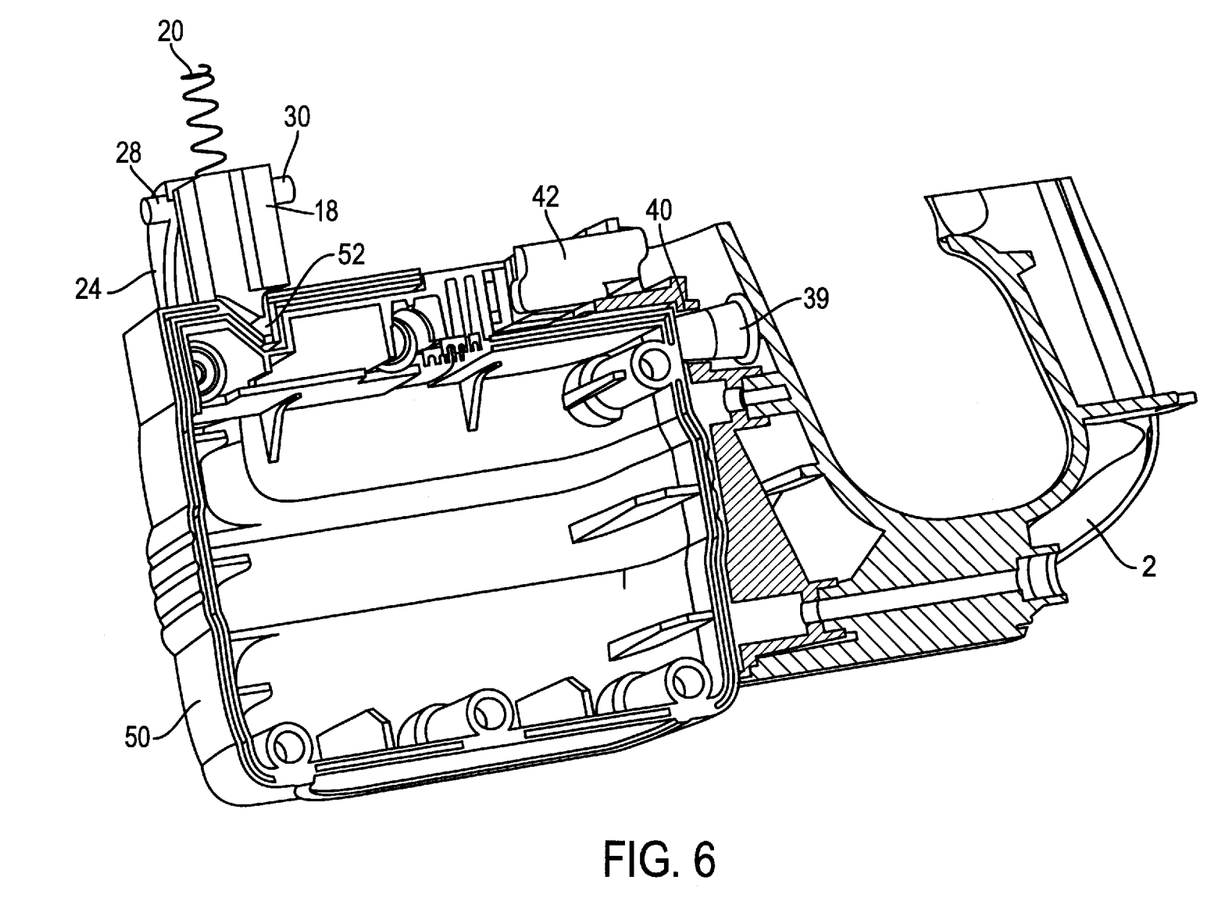
FIG. 6 is a partial perspective view showing a portion of one half shell of a grip housing of the drilling hammer od FIG. 1, a half shell of the housing of the battery pack used and parts of the motor housing in accordance with certain principles of the invention.
Figure 7:
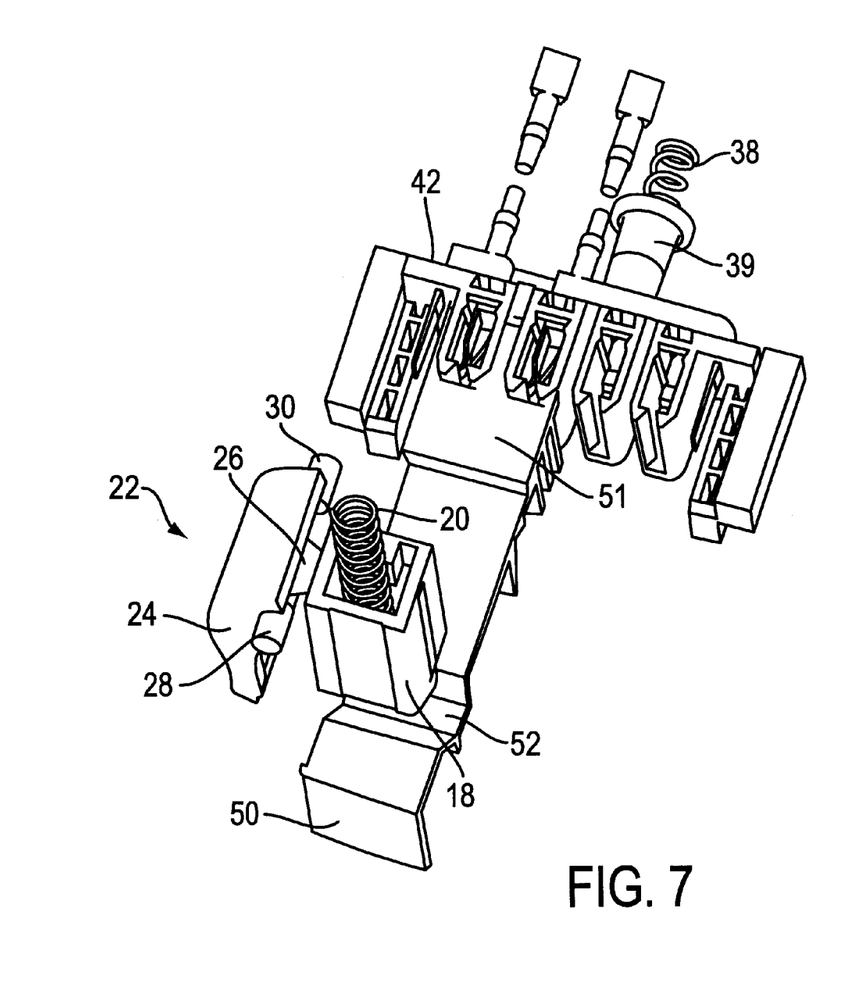
FIG. 7 is a partial perspective view showing the engagement of the tool-side contacts and the battery-side contacts when the battery pack is locked in its operative position according to certain principles of the invention.

At their lower ends, the covers 8, 9 form inwardly projecting rails 36, 37 which extend at least approximately parallel to the longitudinal axis 6, and which serve as guide and retaining rails for assembling and mounting the battery pack 50. The battery pack 50 is formed with channels 54, 55 of complementary form to the rails 36,37, and are open at the rear end. This allows the front ends of the rails 36, 37 to enter the channels 54, 55 and the battery pack 50 to be pushed along the rails to an end position in which, as shown in FIGS. 1 and 2, the rear wall of the battery pack lies against a front surface formed by the two half shells of the grip housing 2. The latch elements 18,19 are formed with wedge-shaped surfaces 18b,19b at their lower ends. As the battery pack 50 is assembled with the tool housing 3, upper surfaces of each of the latch elements 18,19 engage and compress the compression springs 20,21, fully into the recesses 16, 17. In the fully mounted position of the battery pack 50, as shown in FIG. 6, the latch elements 18, 19 snap into latch recesses 52, 53 formed in an upper surface of the battery pack and lock the battery pack against forward displacement from this operative or fully mounted position. In this manner, the rails 36,37 and the channels 54,55, respectively, form a rail-and-channel structure of the drilling hammer for releasably mounting the battery pack 50 with the hammer.

Thus, the locking device is located on the tool housing 3 for locking the battery pack 50 with the housing in a battery-pack operative position. The locking device includes a latch structure, formed by the latch elements 18,19, which is locatable between a device latched position, coincidental with the operative position of the battery pack, and a device release position.

As shown in FIGS. 2, 6, 7, 9, 10 and 11, a plurality of tool contacts 42 are attached to the motor housing 1, and are electrically connected via connections to the different components within the tool housing 3. The tool contacts 42 are arranged in a frame which opens towards the front. A corresponding plurality of battery contacts 51 are located on the upper side of the battery pack 50 in the rear region thereof, and are mounted in a frame which is open at the rear. In the position shown in FIGS. 2, 6 and 7, that is, the locked or operative position of the battery pack 50, the battery contacts 51 are in electrically conducting engagement with the tool contacts 42.

As shown in FIG. 6, an aperture 40 is formed in an upper end region of the bearing surface of the tool housing 3, which is a bearing surface for the rear end face of the battery pack 50. A generally thimble shaped cap 39 extends into the aperture 40, and has at its rear end an outwardly directed shoulder, the external diameter of which is larger than the diameter of the aperture 40, so that the cap 39 is unable to escape from the housing through the aperture 40. The cap 39 is biassed by a helical spring 38, which is located on a supporting pin 41 (FIG. 10) formed integrally with the wall of the grip housing 2 opposite the aperture 40. The helical spring 38 bears against this wall of the grip housing 2 to effect a forward displacement of the cap 39, that is, to effect a displacement towards a position in which the shoulder of the cap 39 bears against the wall region surrounding the aperture 40. As shown in FIG. 6, with the battery pack 50 inserted and located in the locked or operative position, the cap 39 is pushed as far as possible into the tool housing 3 with the helical spring 38 fully compressed.

In order to separate the battery pack 50 in its operative position from the drilling hammer, a user grips the covers 8, 9 and the front region of the battery pack 50 with one hand from the front, and presses inward, for instance with a thumb and forefinger, the outer arms 24, 25 of the operating elements 22 and 23. This causes the operating elements 22,23 to pivot about their pivot pins 28, 30 and 29, 31, respectively, whereby the latch elements 18, 19 are lifted, against the force of the compression springs 20, 21, that is, they are moved further into the recesses 16, 17, until the lower ends of the latch elements 18, 19 are retracted from the latch recesses 52, 53 of the battery pack 50. As the latch elements 18, 19 release the battery pack 50, the battery pack is urged by the force of the helical spring 38, which presses the cap 39 against the battery pack, forwardly along the rails 36, 37. A slight displacement of the battery pack 50 is sufficient to ensure that the latch elements 18, 19 do not re-enter the latch recesses 52, 53 of the battery pack 50 after the operating elements 22, 23 have been released. Instead the latch elements 18,19 abut the upper surface of the battery pack 50. The helical spring 38 not only effects the slight displacement of the battery pack 50, but on release or retraction of the latch elements 18, 19, the helical spring 38 also urges the battery pack such a distance along the rails 36 and 37 for a distance sufficient to safely disengage the battery contacts 51 from the tool contacts 42.

Accordingly, the displacement of the battery pack 50 by the helical spring 38 effects not only a mechanical disengagement of the battery pack, but also causes the electrical connection between the battery pack and the drilling hammer to be safety interrupted. For that purpose, the spring 38 has a restoring force that is greater than the weight of the battery pack 50, so that a corresponding displacement of the battery pack can be reliably effected. Thus, even when the user unlocks the battery pack 50 with the tool holder 7 of the power tool pointed upward the battery pack is moved by the spring 38 against gravity along the vertically positioned rails 36, 37. Moreover, the travel of the spring 38 between the fully compressed position (FIG. 6) and the position in which the outwardly directed shoulder of the cap 39 is supported against the wall region of the tool housing 3 surrounding the aperture 40 (FIG. 10), is greater than the length over which the battery contacts 51 in the operative position of the battery pack 50 shown in FIGS. 1, 2 and 6 are in engagement with the tool contacts 42. As the latch elements 18, 19 are displaced from the locked position shown in FIG. 6 into the release position shown in FIG. 10, in any orientation of the power tool the spring 38 reliably effects a displacement of the battery pack 50 along the rails 36, 37, such that a separation of the battery contacts 51 and the tool contacts 42 is effected.

Figure 10:
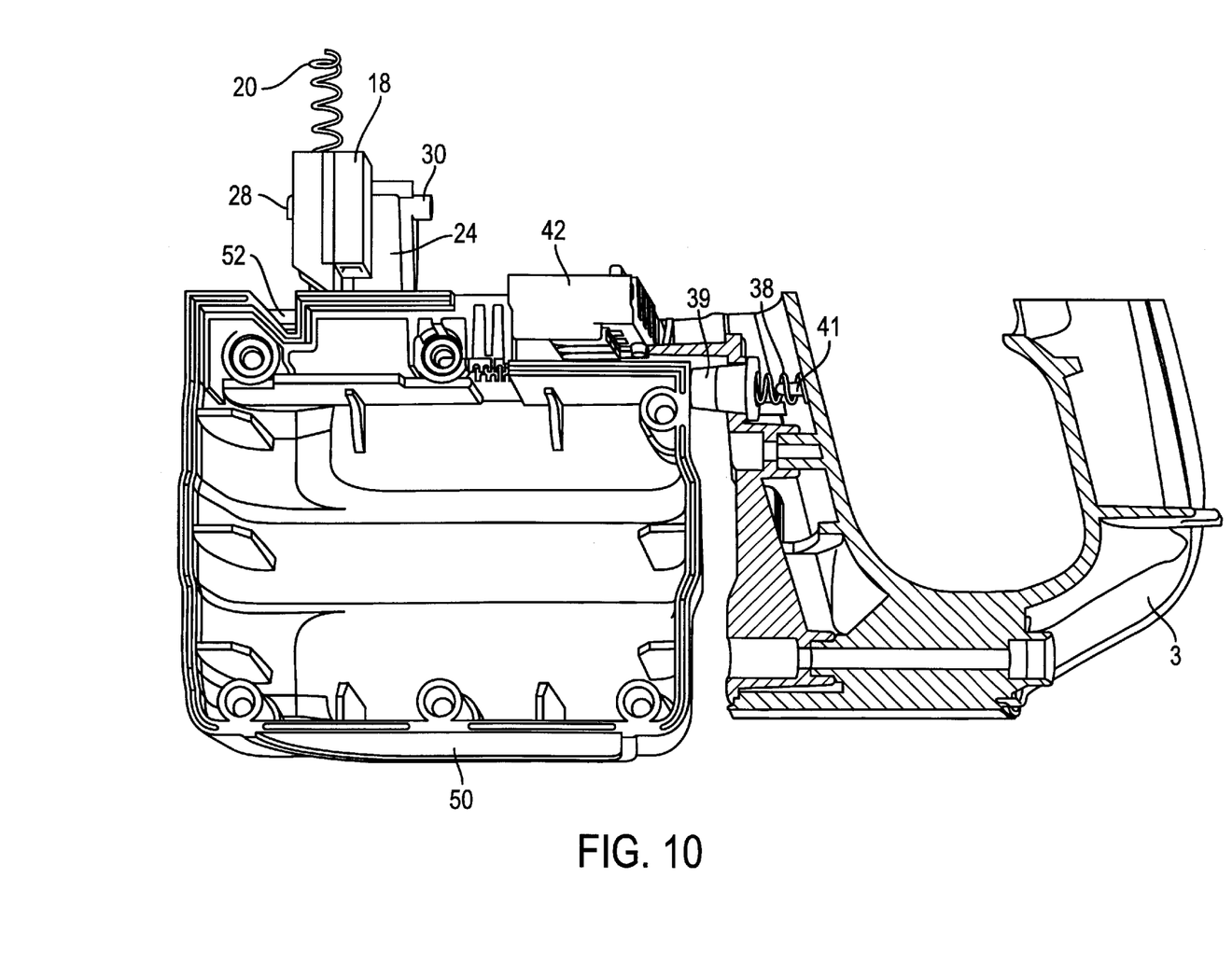
FIG. 10 is a partial perspective view, corresponding to FIG. 6, showing the battery pack unlocked.
Figure 11:
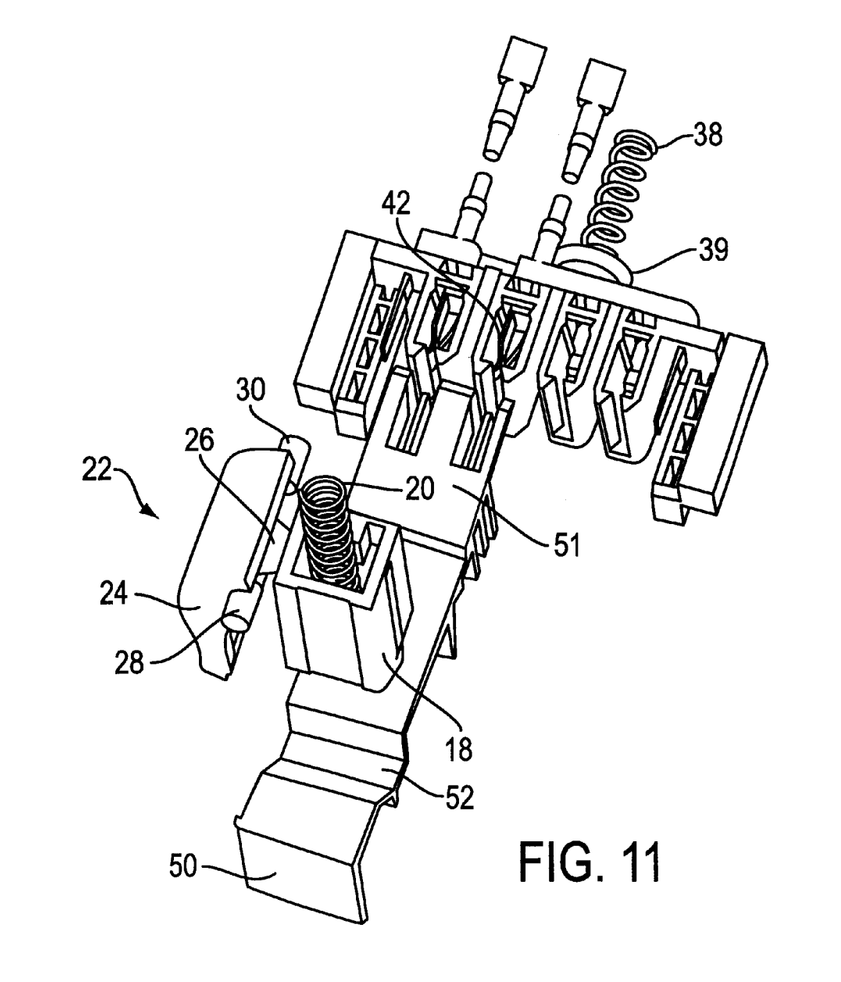
FIG. 11 is a partial perspective view, corresponding to FIG. 7, showing the position of the tool-side contacts and the battery-side contacts with the battery pack unlocked.

For the rest, the travel of the spring 38 between the fully compressed position (FIG. 6) and the position shown in FIG. 10, in which the outwardly directed shoulder of the cap 39 rests against the wall region surrounding the aperture 40, should not be so large that the battery pack 50 is moved into a position in which it is no longer reliably held on the rails 36, 37, but is virtually "shot out" of its mounting on the rails. It is therefore advantageous if the travel or expandability of the spring 38 is no greater than half the length of the battery pack 50 in the region of the rail-and-channel structure 36, 37, 54, 55 in the direction of the longitudinal extent of the channels 54, 55, so that, in the state displaced by the spring 38, the battery pack still rests on at least half the longitudinal extent of the rails 36, 37.

Figure 8:
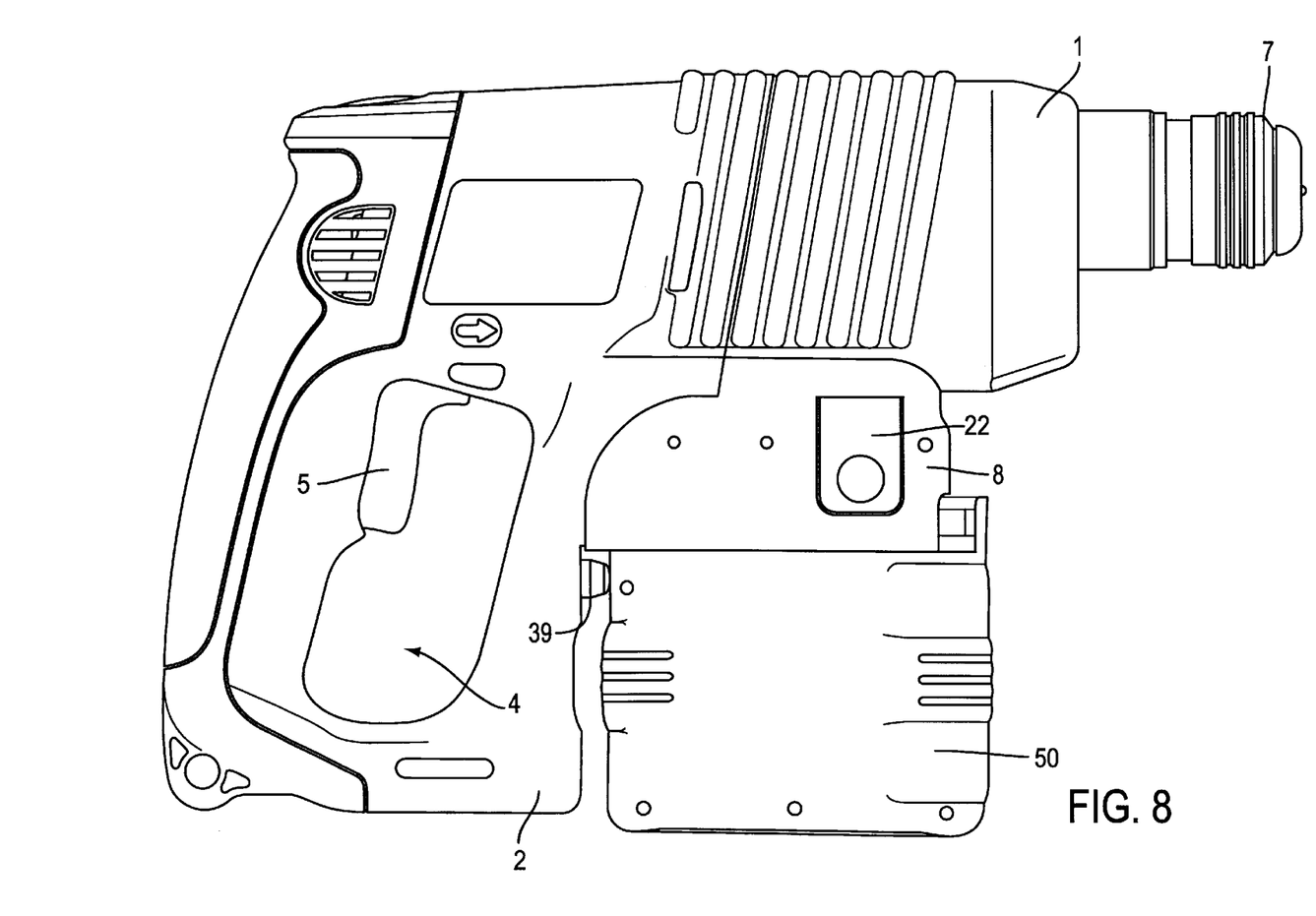
FIG. 8 is a side view showing the drilling hammer of FIG. 1 with an unlocked battery pack.
Figure 9:
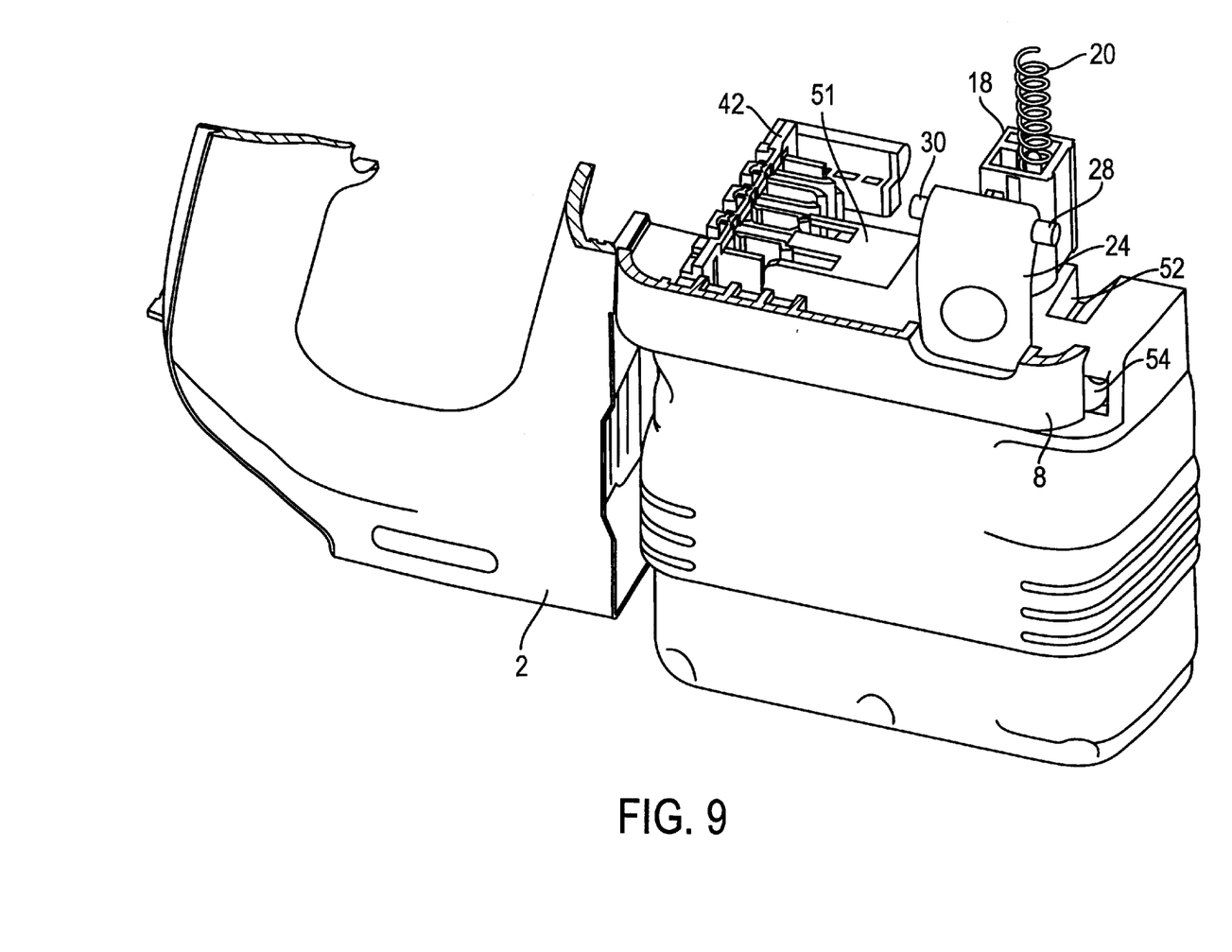
FIG. 9 is a partial perspective view, corresponding to FIG. 2, showing the battery pack unlocked.

When the user inserts the battery pack 50 into the drilling hammer, the user must move the battery pack sufficiently to displace the cap 39 a distance sufficient to compress the spring 38 to allow the battery pack to be moved into the position in which the latch elements 18, 19 lock into the latch recesses 52, 53 of the battery pack. In that position, the battery contacts 51 are then also electrically connected to the tool contacts 42. If, however, the user fails to push in the battery pack 50 until the latch elements 18,19 lock in, on being released the battery pack will be displaced by the action of the spring 38 into the position shown in FIGS. 8 and 10, so that this error is obvious to the user. Moreover, there is no chance whatsoever that the battery pack 50 can be electrically connected with the drilling hammer and can set this in operation when the battery pack is not locked in its operative position by engagement of the latch elements 18, 19.

The battery contacts 51 and the tool contacts 42 have a prescribed contact length, along which they electrically engage, and extend in a direction along the longitudinal extent of the rail-and-channel structure 36,37,54,55. To insure that the contacts 42 and 51 are not accidentally engaged when the battery pack 50 is not fully locked into position on the tool housing 3, the travel or expandability of the spring 38 is greater than the prescribed contact length to urge the battery pack sufficiently away from its operative position on the tool housing to preclude engagement between the contacts.

In general, the above-identified embodiments are not to be construed as limiting the breadth of the present invention. Modifications, and other alternative constructions, will be apparent which are within the spirit and scope of the invention as defined in the appended claims.

What is claimed is:

1. A battery-powered, hand-guided power tool in which a rechargeable battery pack is releasably connected, which comprises:
 a tool housing;
 a rail-and-channel structure formed with a longitudinal extent between opposite ends thereof, for facilitating the assembly of the battery pack in an operative position on the tool housing;

a locking device located on the tool housing for locking the battery pack with the housing in the operative position, and including a latch structure which is locatable between a device-latched position, coincidental with the operative position of the battery pack, and a device-release position;

a plurality of electrical battery contacts located on the battery pack;

a plurality of electrical tool contacts located on the tool housing;

the battery contacts and the tool contacts having a prescribed contact length along which they electrically engage;

the battery contacts and the tool contacts extending in a direction along the longitudinal extent of the rail-and-channel structure, and being electrically connected when the battery pack is in the operative position;

the battery pack being movable from the operative position into a battery release position when the latch structure is moved from the device-latched position to the device-release position to permit the battery pack to be moved in the direction of the longitudinal extent of the rail-and-channel structure for removal from the tool housing;

a spring located on the tool housing and positioned to apply a spring-loaded force to the battery pack in the operative position in a direction of a displacement movement of the battery pack out of the operative position; and the spring being expandable by a distance greater than the prescribed contact length, and the restoring force of the spring when extended to the prescribed contact length being greater than the weight of the battery pack.

2. A power tool according to claim 1, wherein the spring can be expanded by a distance no greater than half the length of the battery pack adjacent the rail-and-channel structure in the direction of the longitudinal extent thereof.

3. A power tool according to claim 1, wherein the latch structure comprises two operating elements arranged on opposite sides of a central plane containing a longitudinal axis of the tool housing.

4. A power tool according to claim 1, wherein the rail-and-channel structure includes rails which extend at least approximately parallel to a longitudinal axis of a tool holder of the power tool and is located forward of a grip housing of the power housing which extends away from the longitudinal axis of the tool holder, and the spring is mounted at a forward side of the grip housing.

5. A power tool according to claim 4, wherein the spring is a helical spring having a cap on one end extending through an opening in a wall of the grip housing and has an outwardly directed shoulder which engages an inside wall portion of the grip housing adjacent the opening.

* * * * *

UNITED STATES PATENT AND TRADEMARK OFFICE
CERTIFICATE OF CORRECTION

PATENT NO. : 6,223,835 B1
DATED : May 1, 2001
INVENTOR(S) : Winrich Habedank et al.

It is certified that error appears in the above-identified patent and that said Letters Patent is hereby corrected as shown below:

<u>Title page,</u>
Item [56], under References Cited, add the following U.S. PATENT DOCUMENTS:

| | | | |
|---|---|---|---|
| -- | 4,834,092 | 05/30/1989 | Alexson et al. |
| | 4,751,452 | 06/14/1988 | Kilmer et al. |
| | 4,736,742 | 04/12/1988 | Alexson et al. |
| | 4,728,876 | 03/01/1988 | Mongeon et al. |
| | 4,447,749 | 05/08/1984 | Reeb, Jr. et al. |
| | 4,441,563 | 04/10/1984 | Walton, II |
| | 4,386,609 | 06/07/1983 | Mongeon |
| | 4,091,880 | 05/30/1978 | Troutner et al |
| | 4,050,528 | 09/27/1977 | Foltz et al. |
| | 3,999,110 | 12/21/1976 | Ramstrom et al. |
| | 3,943,934 | 03/16/1976 | Bent |
| | 3,734,207 | 05/22/1973 | Fishbein |
| | 3,494,799 | 02/10/1970 | Pedone, Jr. |
| | 3,120,845 | 02/11/1964 | Horner |
| | 2,460,149 | 01/25/1949 | Schoensicgel |
| | 2,261,230 | 11/04/1941 | Cox et al. |
| | D364,463 | 11/21/1995 | Pitzen et al. |
| | 5,792,573 | 08/11/1998 | Pitzen et al. |
| | 5,388,749 | 02/14/1995 | Davignon et al. |
| | 5,360,073 | 11/01/1994 | Akazawa |
| | 5,306,285 | 04/26/1994 | Miller et al. |
| | 5,263,972 | 11/23/1993 | Evans et al. |
| | 5,244,755 | 09/14/1993 | Benoist et al. |
| | 5,235,261 | 08/10/1993 | Philipp |
| | 5,213,913 | 05/25/1993 | Anthony, III et al. |
| | 5,208,525 | 05/04/1993 | Lopic et al. |
| | 5,207,697 | 05/04/1993 | Carusillo et al. |
| | 5,136,469 | 08/04/1992 | Carusillo et al. |
| | 5,122,427 | 06/16/1992 | Flowers et al. |
| | 5,089,738 | 02/18/1992 | Bergqvist et al. |
| | 5,026,384 | 06/25/1991 | Farr et al. |
| | 4,873,461 | 10/10/1989 | Brennan et al. |
| | 4,871,629 | 10/03/1989 | Bunyea |
| | 4,835,410 | 05/30/1989 | Bhagwat et al. -- |

UNITED STATES PATENT AND TRADEMARK OFFICE
CERTIFICATE OF CORRECTION

PATENT NO. : 6,223,835 B1
DATED : May 1, 2001
INVENTOR(S) : Winrich Habedank et al.

It is certified that error appears in the above-identified patent and that said Letters Patent is hereby corrected as shown below:

<u>Title page, cont'd</u>
Item [56], under References Cited add the following: U.S. PATENT DOCUMENTS

| | | | |
|---|---|---|---|
| -- | 4,208,804 | 09/23/1993 | Germany |
| | 9,002,514 | 08/08/1991 | Germany |
| | 0,374,600 | 06/27/1990 | EPO (Related to US 5208525) |
| | 3,502,449 | 08/08/1985 | Germany -- |

Signed and Sealed this

Sixteenth Day of July, 2002

*Attest:*

JAMES E. ROGAN
*Attesting Officer*   *Director of the United States Patent and Trademark Office*